March 10, 1970     H. POLICANSKY     3,499,609

VARIABLE SPEED FISHING REEL WITH FRICTION DRIVE

Filed July 14, 1967     2 Sheets-Sheet 1

United States Patent Office 3,499,609
Patented Mar. 10, 1970

3,499,609
VARIABLE SPEED FISHING REEL WITH
FRICTION DRIVE
Hyman Policansky, Box 1154, Cape Town,
Cape Province, Republic of South Africa
Filed July 14, 1967, Ser. No. 653,560
Claims priority, application Great Britain, July 14, 1966,
31,650/66
Int. Cl. A01k 89/02
U.S. Cl. 242—84.44                                    12 Claims

ABSTRACT OF THE DISCLOSURE

A fishing reel frame has opposite end housings, each supporting an end of a spindle on which a spool can rotate. A crank-operated transmission in one end housing is connected to the first end of the spindle while the second end of the spindle carries an expandable clutch-brake means to adjustably, frictionally connect the spindle to the spool. A lever at the first end of the spindle is rotatable to shift the spindle axially which causes balls on the spindle to coact with a tapered cam on the clutch-brake means to regulate the friction force in the clutch-brake means. A plug-like screw threaded in the second end of the spindle has a cam end to position the balls relative to the spindle. A pawl and ratchet prevent reverse rotation of the clutch-brake means. The crank-operated transmission includes change-speed gearing.

---

The present invention relates to fishing reels and, more particularly, to fishing reels of the multiplying type which incorporate a friction coupling, constituting both a clutch and a brake in the drive between the winding handle and the spool, whereby variable drag can be applied to the fishing line when it is being pulled off the spool by a fish.

The invention consists in a fishing reel wherein a spool for fishing line is freely rotatable on a spindle, which is rotatable by the winding handle, and is connectable to the spindle by an internal expanding friction clutch or brake mechanism which rotates with the spindle and co-operates with a cylindrical friction surface on one of the end flanges of the spool, said mechanism being actuated by axial movement of the spindle relative to the mechanism.

With the clutch or brake mechanism engaged with the friction surface, the winding handle can be turned to rotate the spool and wind fishing line on to the spool. However, when line is pulled off the spool and the spindle is kept stationary, preferably by means of a pawl and ratchet wheel associated with the spindle, the mechanism exerts a braking force on the friction surface, which rotates with the spool, and thereby produces drag on the fishing line. The axial position of the spindle relative to the mechanism can be adjusted to vary the coupling pressure between the clutch or brake mechanism and the friction surface so that the drag can be varied. Preferably, the mechanism can be completely disengaged from the friction surface so that the spool can free wheel, for example, to allow for casting of the fishing line.

Conveniently, means are provided for adjusting the range of movement of the clutch or brake mechanism, independently of the axial movement of the spindle. This enables the mechanism to be readily set up for correct operation upon initial assembly and also allows ready adjustment of the reel subsequently to compensate for any wear of the clutch or brake mechanism.

The winding handle may be geared to the spindle and the gear drive may incorporate a change-speed gear arrangement. To this end, the present invention further consists in a fishing reel of the multiplying type having a change-speed gear arrangement in the drive mechanism between the winding handle and the spool, wherein said arrangement comprises two gear wheels of different diameters mounted on a rotatable shaft and selectively connectable to the shaft in order to provide a drive between the shaft and one of the two pinions meshing respectively with the gear wheels, the larger diameter gear wheel being connected to the shaft by a key member which is axially slidable relative to the larger diameter gear so as to be disengagable therefrom, and the smaller diameter gear wheel being connectable to the shaft by a pawl and ratchet mechanism, whereby the shaft is rotatable relative to the smaller diameter gear when the key member is engaged with the larger diameter gear to transmit rotation of the shaft thereto and rotates the smaller diameter gear through the pawl and ratchet mechanism when the key member is disengaged.

Conveniently, the key member is spring-urged into engagement with the larger diameter gear and is slidable out of engagement with the latter by a rod, the arrangement being such that, when the key member is disengaged, the rod can be moved relative to the key member, regardless of the relative positions of the key member and the co-operating means on the gear, in order to permit the key member to spring into engagement with said co-operating means when these parts coincide.

In order that the present invention may be more readily understood, reference will now be made to the accompanying drawings, in which.

Figure 1:
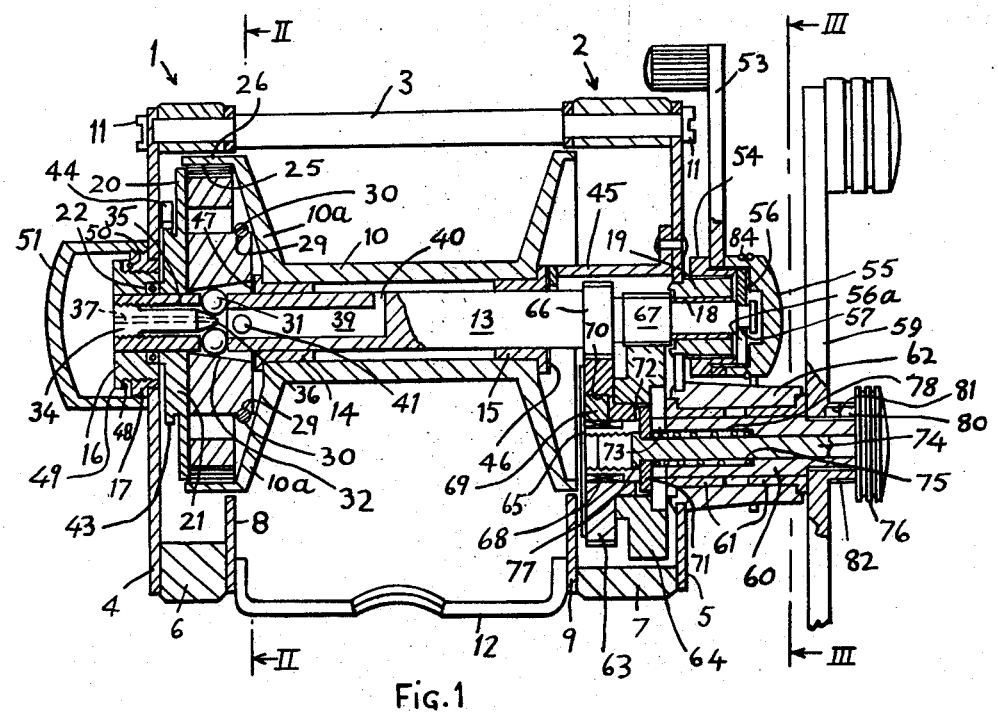
FIGURE 1 is an axial section through a fishing reel embodying the invention.

Referring to the drawings, the fishing reel includes a frame formed by a pair of circular end housings 1, 2 spaced apart and connected together by rod members 3. The housings comprise outer plates 4, 5, peripheral wall members 6, 7 and generally annular inner plates 8, 9 which surround the end flanges of the spool 10 and co-operate therewith so as substantially to close the housings on their inside. The parts of each end housing are secured together by the rod members 3 and screws 11 screwed into the outer ends of the rods. A reel seat 12, by which the reel may be attached to a fishing rod, is secured between the inner plates 8, 9.

Rotatably mounted between the end housings is the spool 10 for fishing line. This spool is mounted on a spindle 13, so as to be freely rotatable thereon, by means of bearing bushes 14, 15. The spindle 13 has its opposite ends rotably mounted in the end housings. Its left-hand end, as seen in FIGURE 1, is journalled in a bearing bush 16 screwed into a bearing housing 17 secured in a central aperture in the outer plate 4 of the left-hand housing 1, whilst its right-hand end has and end portion of reduced diameter journalled in a bearing 18 disposed in a bearing housing 19 secured in a central aperture in the outer plate 5 of the right-hand housing 2.

Figure 2:
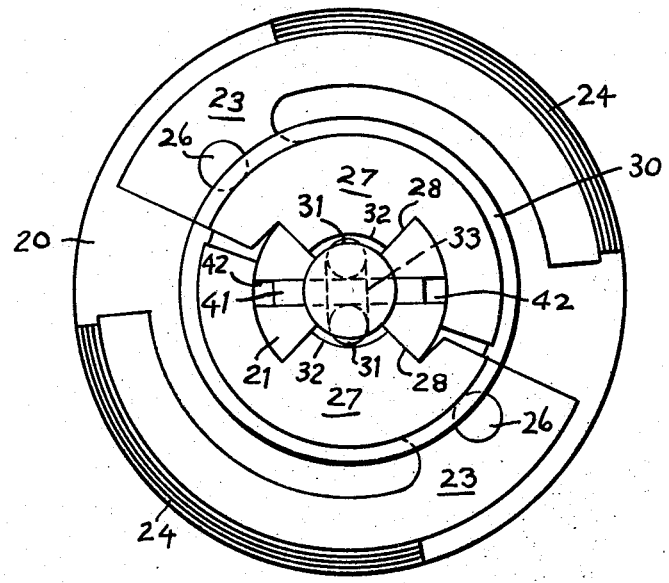
FIGURE 2 is a section on the line II—II of FIGURE 1.

The spool 10 is connectable to the spindle 13 by an internal expanding friction clutch or brake mechanism disposed within the left-hand end housing 1. This mechanism comprises an annular mounting plate 20 which is disposed on the spindle at its left-hand end and has a hub portion 21 located between the bearing 14 and a thrust ball-bearing 22 carried by the bearing 16. At diametrically opposite positions on the inside of the mounting plate 20, is mounted a pair of arcuate clutch or brake shoes 23. The latter have friction linings 24 on their outer surfaces which co-operate with a cylindrical friction surface 25 formed by an axial extension 26 of the peripheral rim of the adjacent end flange 10a of the spool. As is more particularly shown in FIGURE 2, the shoes 23 are pivoted at opposite ends on bosses 26 projecting from the inside face of the plate 20 and have generally semi-circular hub portions 27 which have their inner peripheries so formed as to fit into V-shaped slots 28 formed through the hub portion 21 of the mounting plate. The hub portions 27 form a substantially continuous circular seat 29 for a circular, helical tension spring 30 which resiliently urges the shoes away from the cylindrical friction surface 25. The shoes are respectively pivoted into contact with the friction surface, against the action of this spring, by means of two balls 31 mounted in the spindle 13 and abutting inclined cam surfaces 32 formed on the inner periphery of the parts of the hub portion 27 projecting into the slots 28. The balls 31 in conjunction with the cam surfaces 32 control radial movement of the shoes in response to axial movement of the spindle 13.

The balls 31 are disposed at opposite ends of a transverse bore 33 in the spindle 13 and are maintained in a projecting position for actuating the clutch or brake mechanism, and are radially adjustable, by means of a screw 34 which is screwed into an axial bore 35 extending along the spindle 13 from its left-hand end. The screw has a tapered inner end 36 which bears against the balls 31 so that axial movement of the screw effects radial movement of the balls and controls the amount of projection of the latter. The screw 34 is of reduced diameter over a major portion of its length extending from its inner end so that the tapered end of the screw is free to move, within limits, in any radial direction in order to provide self-centering characteristics for the brake shoes. Thus, whilst the screw is maintained in its adjusted axial position by virtue of the screw thread, movement in any radial direction is possible, because of tolerance between the male and female threads and the short length of engagement of the screw threads, and is limited by the internal diameter of the bore 35. The outer end of the screw 34 has a screwdriver slot (not shown) to enable adjustment of the screw which can readily be turned to effect correct setting of the balls 31 upon initial assembly of the reel and to enable subsequent adjustment of the balls in order to compensate for wear of the parts of the clutch or brake mechanism, for example, of the cam surfaces 32 and friction linings 24. Moreover, to enable lubrication of the spool bearings 14, 15, the screw has an axial oil passage 37 drilled therethrough and this communicates with an axial bore 39 in the spindle 13, which bore terminates in a transverse port 40 opening into the space between the spool bearings.

The spindle 13 is coupled to the mounting plate 20 so as to rotate the plate by a driving pin 41 extending transversely through the spindle at right angles to the bore 33 and having projecting ends which engage in diametrically opposite axial slots 42 in the hub portion 21 of the mounting plate. The pin 41 is of smaller diameter than the bore 39 in the spindle so that oil can flow past the pin to the port 40.

In order to prohibit rotation of the spindle and clutch or brake mechanism in one direction, the mounting plate 20 has a circular array of ratchet teeth 43 formed on its outside surface about the spindle 13 and these teeth co-operate with a pawl 44 pivoted to the inside of the plate 4 of the end housing 1.

The clutch or brake mechanism and spool 10 are retained in a substantially fixed axial position and are prevented from axial movement with the spindle 13 by the spindle bearing 16 and an arm 45 riveted to the inside of the outer plate 5 of the end housing 2. The bearing 16 is screwed into its housing 17 until the thrust bearing 22 carried at its inner end abuts the hub portion 21 of the mounting plate 20 and, through this hub portion, the bearing 14 and the spool 10, pushes the spool bearing 15 against a yoke portion formed at the inner end of the arm 45. This yoke portion presses on the bearing 15 through a washer 46 made from anti-friction material and an anti-friction washer 47 is also disposed between the hub portion 21 and the bearing 14 so as to facilitate free rotation of the spool with respect to the mounting plate and arm 45. The bearing 16 is maintained in an adjusted position by a spring lock washer 48 acting between a radial flange 49 at the outer end of the bearing and an annular recess 50 in the adjacent surface of the housing 17. The left-hand end of the spindle screw 34 bearing 16 and housing 17 are covered by a protecting cap 51 which screws onto the periphery of the housing 17.

As mentioned above, the clutch or brake mechanism is actuated in response to axial movement of the spindle 13 relative to the mechanism, which causes the balls 31 to bear on the cam surfaces 32 and move the shoes 23 radially outwardly. Axial movement of the spindle is effected by means of a manual lever 53. The latter rotates a collar 54 screwed on to the outside of the bearing housing 19 at the right-hand end of the spindle and, for this purpose, the aperture in the lever fitting over the collar is provided with a flat which co-operates with a corresponding flat on the collar. The lever is secured to the collar by a cap 55 which screws onto the outside of the collar to clamp the lever between the collar and cap. The top of the cap 55 covers the outer end of the spindle and a washer 56 having a generally radial slot 56a is disposed between the outer end of the collar 54 and the inside surface of the top of the cap so as to be axially moveable with the collar and cap upon screwing of the latter on the bearing housing 19. The slot 56a of washer 56 engages in an annular groove 57 formed around the projecting end of the spindle. Thus, turning movement of the lever screws the collar 54 with respect to the housing 19 and the resulting axial movement is transmitted to the spindle by the slotted washer 56 and groove 57 to cause the spindle to actuate the clutch or brake mechanism.

The spindle 13 is coupled to a winding handle 59 via a gear drive mechanism which is disposed within the end housing 2 and incorporates a change-speed gear arrangement. The winding handle is attached to the outer end of a hollow drive shaft 60 which is rotatably mounted in a pair of bearing bushes 61 carried in a bearing housing 62 projecting outwardly from the outer plate 5 of the end housing and having its inner end secured in an opening in this plate. The inner end of the drive shaft 60 projects into the end housing and has two gear wheels 63, 64 rotatable mounted thereon between the inner bearing 61 and a disc member 65 having a screw threaded boss screwed into the inner end of the drive shaft. The two gear wheels are of different diameters, having different numbers of gear teeth, and mesh respectively with two co-operating pinions 66, 67 secured to the reduced end portion of the spindle. The smaller diameter gear wheel 63 is connectable to the drive shaft 60 by a pawl and ratchet mechanism comprising ratchet teeth 68 formed around the outside of the drive shaft at its inner end and a co-operating pawl 69 pivotally mounted in a recess 70 in the face of the gear wheel 63 adjacent the disc 65. The larger diameter gear wheel 64 is connectable to the shaft by a transverse key member 71 which is arranged to engage in diametrically opposite notches 72 in the inner periphery of the gear wheel 64 and which is slidable along axial slots 73 in the drive shaft under the control of a rod 74 and compression spring 75. The rod 74 projects through the centre of the drive shaft and has a head 76 on its outer end to facilitate gripping thereof. The key member 71 is slidably mounted on the inner end of the rod and is retained thereon by a head portion 77 against which the key abuts. The key member 71 is resiliently urged in a direction to engage the notches 72 by the compression spring 75 which is disposed about the rod 74 between the key member and the end wall of a counter-bore 78 surrounding the rod. The gear wheel 63 has a boss portion around its inner periphery which projects into a complimentary recess in the inner periphery of the gear wheel 64 and closes the ends of the adjacent ends of the notches 72.

The head 76 has an inwardly projecting pin 80 which in one rotated position of the rod fits into a recess 81 in the handle boss 82 and otherwise rides on the surface of the handle boss so as to define two discrete axial positions for the rod. In FIGURE 1, the pin is shown positioned in the recess so that the rod is in its innermost position and the key member 71 is engaged in the notches 72 to transmit drive to the spindle 13 through the gear wheel 64 and its associated pinion 67. When the drive shaft is coupled to the gear wheel 64 and the winding handle is turned to rotate the spindle through this gear wheel, the pawl and ratchet mechanism 69, 68 allows the drive shaft to rotate relative to the gear wheel 63.

In order to select the other gear ratio drive, the rod 74 is pulled outwardly, thereby moving the key member 71 out of engagement with the notches 72 against the action of the compression spring 75, and is rotated so that the pin 80 rests on the surface of the handle boss 82 and maintains the rod in its outermost position. In this position of the rod, the gear wheel 64 is freely rotatable on the drive shaft and turning of the winding handle now rotates the gear wheel 63 through the pawl and ratchet mechanism, 69, 68 in order to transmit drive to the spindle through this gear wheel and its associated pinion 66. When it is desired to re-select the gear wheel 64, the rod is turned to position the pin 80 in the recess 81, so that the rod is moved to the left and releases the key member 71. Since it is unlikely that the key member 71 will then coincide with the notches 72 in the gear wheel 64, the key abuts the adjacent face of the latter and the spring 75 is maintained in a compressed condition. If the winding handle is now turned, the gear wheel 64 rotates relative to the key member, owing to the fact that the drive shaft is still coupled to the gear 63, and when the key coincides with the notches 72 it snaps into the latter under the action of the spring 75, whereupon the drive is reconnected to the spindle 13 through the gear wheel 64 and the pinion 67.

The fishing reel operates as follows. When the lever 53 is manually turned to move the spindle to the left, as viewed in FIGURE 1, the clutch or brake shoes 23 are moved radially outwardly by the action of the balls 31 on the cooperating cam surfaces 32 and the friction linings 24 are urged into contact with the cylindrical friction surface 25 on the adjacent end flange of the spool 10. The angle of inclination of the cam surfaces 32 is such that the operating action is not reversible, that is, when friction coupling pressure is applied by the shoes 23 by moving the spindle 13 to the left and forcing the shoes radially outwardly, the resultant opposing forces (friction surface 25 and spring 30) cannot move the spindle to the right and the spindle remains in its adjusted position. Positive movement of the lever 53 is required in order to alter the friction coupling pressure so that after manually turning the lever, it may be released. If the winding handle 59 is now turned in a clockwise direction, as viewed from the right of FIGURE 1, the spool 10 rotates in an anticlockwise direction. This enables fishing line to be wound on to the spool. The spindle 13 and mounting plate 20 cannot rotate in a clockwise direction since the pawl 44 then engages in the ratchet teeth 43 to prevent rotation. Hence the spool cannot be rotated in a clockwise direction by the winding handle. However, the spool can rotate by itself in the clockwise direction and, when this occurs, the pressure with which the friction linings 24 are pressed against the friction surface 25 determines the braking force applied to the spool and the drag exerted on the fishing line. The degree of drag can be quickly varied by adjusting the lever 53 to move the balls 31 with respect to the cam surfaces 32. In order to allow for casting of the fishing line, the spindle 13 can be moved to the right, by adjustment of the lever 53 to such an extent that the balls 31 enable the shoes 23 to move out of contact with the friction surface under the action of the circular helical spring 30 so that the spool can free-wheel.

Also, whilst the reel is being used, and particularly whilst a fish is being played, the gear ration of the drive between the winding handle 59 and the spool can readily be changed to one or another of its two values by actuating the rod 74 in the manner described above.

It has been found that friction between the slotted washer 56, which engages in the groove 57 in the end of the spindle 13, and the spindle resulted in a loading of the winding handle. This friction occurred when the lever 53 was moved to apply the clutch or brake shoes 23 against the friction surface 25, whereupon the washer moved the spindle to the left, as viewed in FIGURE 1, and thereby moved the shoes radially outwardly against the friction surface 25. As the pressure required to move the spindle was not relieved, the pressure between the washer and the spindle provided frictional engagement of these two parts which was disadvantageously manifest on turning of the winding handle because of the gear train between the drive shaft 16 and the spindle 13. Additionally, axial pressure of the mounting plate 20 against the bearing 22 similarly resulted in loading of the winding handle. Thus, since the angle of inclination of the cam surfaces 32 is such that the operating action is not reversible, there was no relief from the axial thrust to which the spindle was subjected, with the consequent loading of the winding handle mentioned above.

Figure 3:
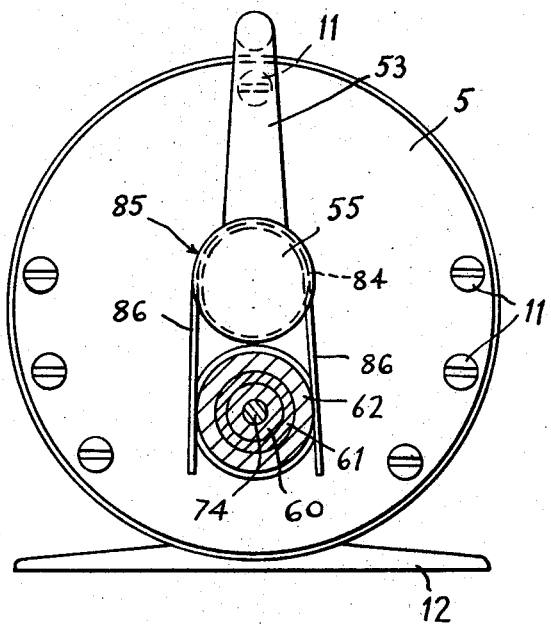
FIGURE 3 is an end elevation of the reel.

Referring particularly to FIGURE 3, in order to overcome the aforementioned disadvantage, a spring 84 having at least one full turn embracing the cap 55 and located in an annular groove 85 about the cap has its two ends 86 disposed astride a fixed projection on the end plate 5, conveniently, astride the bearing housing 62 for the drive shaft. Movement of the lever 53 in any direction causes the spring partially to unwind, thereby reducing its grip on the lever. When the lever is released after adjustment, it moves slightly backward in the reverse direction to that in which it was adjusted by virtue of the spring return. This occurs equally upon movement of the lever in either direction and the effect of this partial return of the lever is the removal of the troublesome axial pressures referred to above and the elimination of the loading on the winding handle.

Whilst a particular embodiment has been described, without departing from the scope of the invention as defined by the appended claims. For example, the inclined cam surfaces 32 may be formed with a steeper part approximately at the position where the shoes 23 become disengaged from the friction surface 25 so that the position of disengagement is more precise and the initial disengagement is more pronounced.

I claim:

1. A fishing reel comprising frame means, a spindle rotatably mounted in said frame means, a spool for fishing line freely rotatable on said spindle, and having opposite end flanges, a winding handle, means coupling said winding handle to said spindle for rotating said spindle in response to rotation of said winding handle, a cylindrical friction surface on one of said end flanges of said spool, an internal expanding friction clutch or brake mechanism coupled to said spindle and co-operating with said cylindrical friction surface for connecting the spindle to said spool, said mechanism comprising an annular mounting member disposed on said spindle and connected thereto, at least one clutch or brake shoe pivotally mounted on said member for radially outward expansion towards said cylindrical friction surface and having a friction lining thereon for engagement with said cylindrical friction surface, an inclined cam surface disposed on said shoe adjacent said spindle, actuating means carried by said spindle and adapted to engage said cam surface in response to axial movement of said spindle to control said radial expansion of said shoe, and spring means resiliently urging said shoe radially inwardly, and manually operable means for effecting axial movement of the spindle relative to said mechanism.

2. A fishing reel as claimed in claim 1, including means for adjusting the range of movement of said shoe independently of axial movement of said spindle.

3. A fishing reel as claimed in claim 2, wherein said mechanism includes a plurality of said clutch or brake shoes and actuating means comprising a plurality of balls disposed in transverse bore means in said spindle, and said range adjusting means comprises an adjustment screw screwed into an axial bore in said spindle and having a tapered end engaging said balls and maintaining said balls in a projecting position for engaging said cam surface, said adjustment screw being axially adjustable for altering the amount of projection of the balls, and wherein said adjustment screw is of reduced diameter for a major portion of its length from said tapered end, whereby said tapered end is movable radially to a predetermined extent.

4. A fishing reel as claimed in claim 1, including means for preventing the spindle from rotating in one direction.

5. A fishing reel as claimed in claim 1, wherein said winding handle is coupled to said spindle by gear drive means, said gear drive means incorporating a change-speed gear arrangement.

6. A fishing reel as claimed in claim 5, wherein said change-speed gear arrangement comprises two gear wheels of different diameters mounted on a rotatable shaft coupled to said winding handle, and two pinions secured to said spindle and meshing respectively with said gear wheels, the larger diameter gear wheel being connected to said shaft by a key member which is slidably coupled to said shaft and engages in notch means in said larger gear, whereby said key member is axially slidable relative to said larger gear so as to be disengageable therefrom and the smaller diameter gear wheel being connected to said shaft by a pawl and ratchet mechanism, whereby said shaft is rotatable relative to said smaller diameter gear when said key member is engaged with said larger diameter gear to transmit rotation of said shaft thereto and rotates said smaller diameter gear through said pawl and ratchet mechanism when said key member is disengaged.

7. A fishing reel as claimed in claim 1, wherein said frame means includes two spaced end housings and said spindle has opposite ends rotatably and slidably mounted in bearings in said end housings, and wherein said manually operable means for effecting axial movement of said spindle comprises manually operable screw thread means connected to one of said end housings by complementary screw thread means fixed to said one end housing in surrounding relation with the adjacent end of said spindle, and means coupling said manual screw thread means to said spindle for producing axial movement of said spindle in response to turning of said manual screw thread means relative to said complementary screw thread means.

8. A fishing reel as claimed in claim 1, said frame means including first and second spaced end housings which are open at their inwardly facing sides, said spindle being rotatably and slidably mounted at opposite ends in bearing means supported by said end housings, said spool being freely rotatable on the spindle between said end housings and having its end flanges co-operating with means at said inwardly facing sides of said housings for substantially closing said sides, an axially extending peripheral flange on one of said spool-end flanges projecting into said first end housing and providing said cylindrical friction surface, an annular mounting member in the form of an annular plate disposed on said spindle within said first end housing, means coupling said spindle to said mounting plate, whereby said spindle rotates the plate and is slidable relative thereto, two arcuate clutch or brake shoes pivotally mounted on said plate for radially outward expansion towards said cylindrical friction surface, said shoes having hub portions provided adjacent said spindle with inclined cam surfaces, two balls disposed respectively at opposite ends of a transverse bore in said spindle and adapted to engage said cam surfaces, adjustment means maintaining said balls in projecting relation from said spindle for engaging said cam surfaces, said adjustment means being adjustable to alter the amount of projection of said balls an annular array of ratchet teeth formed on said mounting plate about said spindle, and a co-operating pawl mounted on said first end housing and engaging in said ratchet teeth to prevent rotation of said mounting plate in one direction, manually operable means being mounted on said second end housing for effecting axially movement of said spindle, and thereby said balls, relative to said inclined cam surfaces 9. A fishing reel as claimed in claim 8, wherein said manually operable means comprises a manually operable lever connected to said second end housing by an internally threaded collar screwed on to a complementary external screw thread formed on means coaxial with said spindle bearing in said second end housing, and coupling means connecting said collar to the adjacent end of said spindle for producing axial movement of said spindle in response to turning of said collar relative to said externally threaded means by said lever, and wherein said winding handle is mounted on said second end housing and is operatively connected to said spindle by gear drive means housed in said second end housing.

10. A fishing reel as claimed in claim 9, wherein said winding handle is rotatably mounted in bearing means projecting outwardly from said second end housing, and wherein a spring has at least one full turn embracing means on said internally threaded collar and has its opposite ends disposed astride said bearing means, whereby the collar after adjustment is moved slightly in the reverse direction to that in which it was adjusted in order to reduce friction pressure between said spindle and said coupling means.

11. A fishing reel as claimed in claim 7, including spring means associated with said manual screw thread means, and adapted to effect slight reverse movement of said manual screw thread means, after adjustment of the latter, in the opposite direction to that in which said manual screw thread means was adjusted, thereby reducing friction pressure between said spindle and said coupling means.

12. A fishing reel as claimed in claim 11, wherein said manual screw thread means comprises a lever provided with internally threaded means engaging externally threaded complementary screw thread means coaxial with said spindle, and wherein said spring means comprises a spring having at least one full turn embracing said internally threaded means and having its opposite ends disposed astride fixed projecting means on said frame means.

References Cited

UNITED STATES PATENTS

| 2,209,598 | 7/1940  | Coxe            | 242—84.44 |
| 2,219,322 | 10/1940 | King            | 242—84.44 |
| 2,282,995 | 5/1942  | Dumond          | 242—84.44 |
| 2,417,732 | 3/1947  | Bland et al.    | 242—84.46 |
| 2,566,803 | 9/1951  | Kovalousky et al. | 242—84.45 |
| 2,580,990 | 1/1952  | Bannister       | 242—84.45 |
| 3,017,135 | 1/1962  | Wood            | 242—84.54 |
| 3,167,272 | 1/1965  | Frode           | 242—84.54 |
| 3,317,159 | 5/1967  | Morritt         | 242—84.52 |

BILLY S. TAYLOR, Primary Examiner

U.S. Cl. X.R.

192—76, 97; 242—84.54